United States Patent
Luo

(10) Patent No.: US 12,277,072 B2
(45) Date of Patent: Apr. 15, 2025

(54) MEMORY SYSTEM AND OPERATION METHOD THEREOF USING TAG-GROUP-BASED RECORDING OPERATION

(71) Applicant: Yangtze Memory Technologies Co., Ltd., Hubei (CN)

(72) Inventor: Xianwu Luo, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 188 days.

(21) Appl. No.: 18/090,865

(22) Filed: Dec. 29, 2022

(65) Prior Publication Data

US 2024/0168892 A1    May 23, 2024

(30) Foreign Application Priority Data

Nov. 18, 2022  (CN) .......................... 202211449415.8

(51) Int. Cl.
G06F 12/14    (2006.01)
G06F 11/10    (2006.01)

(52) U.S. Cl.
CPC .......... *G06F 12/145* (2013.01); *G06F 11/108* (2013.01)

(58) Field of Classification Search
CPC .. G06F 11/108; G06F 11/167; G06F 12/0246; G06F 12/145; G06F 2212/1032; G06F 2212/7207
See application file for complete search history.

(56) References Cited

U.S. PATENT DOCUMENTS

| | | | |
|---|---|---|---|
| 8,949,686 B1* | 2/2015 | Ojalvo ................. | G11C 7/1006 714/763 |
| 2009/0310408 A1* | 12/2009 | Lee .................... | G11C 16/0483 365/185.09 |
| 2019/0205247 A1* | 7/2019 | Lin ..................... | G06F 12/0246 |
| 2020/0075114 A1* | 3/2020 | Lin ..................... | G06F 11/1048 |
| 2020/0210280 A1* | 7/2020 | Singidi ................ | G06F 11/108 |
| 2020/0218606 A1* | 7/2020 | Ji ........................ | G11C 11/5642 |
| 2021/0158874 A1* | 5/2021 | Jang .................... | G06F 3/0619 |
| 2022/0129180 A1* | 4/2022 | Kim .................... | G06F 11/1417 |

FOREIGN PATENT DOCUMENTS

CN          113342577 A  *  9/2021   .......... G06F 11/1448

* cited by examiner

*Primary Examiner* — Albert Decady
*Assistant Examiner* — Enamul M Kabir
(74) *Attorney, Agent, or Firm* — Oblon, McClelland, Maier & Neustadt, L.L.P.

(57) ABSTRACT

Aspects of the disclosure provide the memory system having a memory apparatus and a memory controller coupled with the memory apparatus. The memory apparatus includes at least one memory chip having a plurality of memory planes, each memory plane includes a plurality of pages, a plurality of pages located at the same position in each of the memory planes of the at least one memory chip form a page line, the memory apparatus includes a plurality of tag groups, each tag group includes a plurality of page lines. The memory controller can be configured to, when the memory apparatus is powered down and then powered on, respectively perform, in sequence, a recoding operation on all pages of which the states are programmed states in each tag group, and according to an encoding result corresponding to each tag group, respectively determine whether check data corresponding to each tag group is abnormal.

20 Claims, 9 Drawing Sheets

When a memory apparatus is powered down and then powered on, respectively perform, in sequence, a recoding operation on all pages of which the states are programmed states in each tag group in the memory apparatus — 901

According to an encoding result corresponding to each tag group, respectively determine whether check data corresponding to each tag group is abnormal — 902

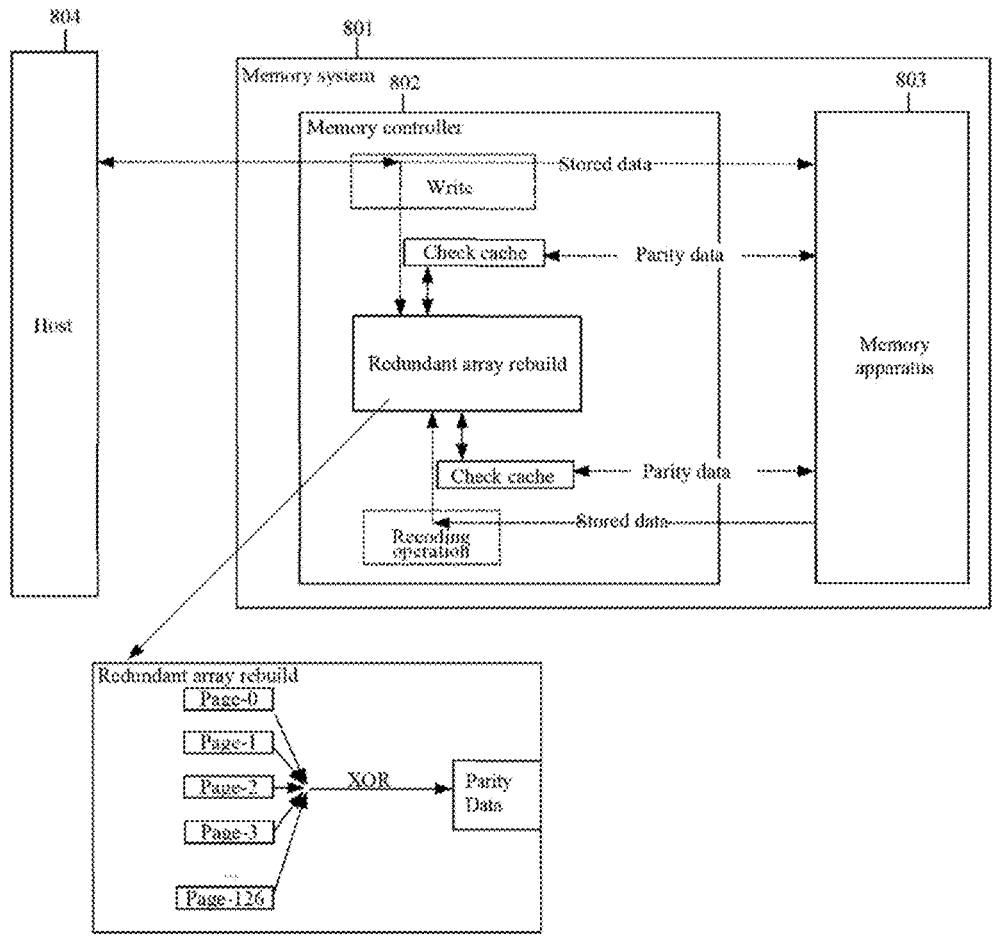

Fig. 8b

When a memory apparatus is powered down and then powered on, respectively perform, in sequence, a recoding operation on all pages of which the states are programmed states in each tag group in the memory apparatus — 901

According to an encoding result corresponding to each tag group, respectively determine whether check data corresponding to each tag group is abnormal — 902

MEMORY SYSTEM AND OPERATION METHOD THEREOF USING TAG-GROUP-BASED RECORDING OPERATION

INCORPORATION BY REFERENCE

This present application claims the benefit of Chinese Patent Application No. 202211449415.8, filed on Nov. 18, 2022, which is incorporated herein by reference in its entirety.

BACKGROUND

Technical Field

Embodiments of the present disclosure relate to the technical field of semiconductors, and in particular, to a memory system and an operation method thereof.

Description of the Related Art

A memory apparatus is a memory device for storing information in the modern information technology. As a typical non-volatile semiconductor memory, a NAND (Not-And, NAND type) memory has become a mainstream product in the storage market due to a higher storage density, a controllable production cost, a suitable programming/erasing speed and retention characteristics.

However, with the continuous improvement of people's requirements for memories, there are still many problems when the memory apparatus and a system thereof perform read-write operations.

SUMMARY

Based on this, embodiments of the present disclosure provide a memory system and an operation method thereof. The memory system includes a memory apparatus and a memory controller coupled with the memory apparatus, wherein the memory apparatus includes at least one memory chip, and each memory chip includes a plurality of memory planes, each memory plane includes a plurality of pages, a plurality of pages located at the same position in each of the memory planes of the at least one memory chip form a page line, the memory apparatus includes a plurality of tag groups, each tag group includes a plurality of page lines. The memory controller is configured to, when the memory apparatus is powered down and then powered on, respectively perform, in sequence, a recoding operation on all pages of which the states are programmed states in each tag group, and according to an encoding result corresponding to each tag group, respectively determine whether check data corresponding to each tag group is abnormal.

In the above solution, the memory apparatus includes M tag groups, and the memory controller is configured to, for an $i^{th}$ tag group, determine the address of a starting encoded page and the address of a final encoded page of each page line in the $i^{th}$ tag group, the starting encoded page including a first programmed page in each page line in the $i^{th}$ tag group according to a programming sequence, and the final encoded page including a last programmed page in each page line in the $i^{th}$ tag group according to the programming sequence, both M and i are integers, and $0 \leq i < M$, perform an encoding operation on all pages of which the addresses are located between the address of the starting encoded page and the address of the final encoded page in each page line in the $i^{th}$ tag group, so as to obtain first check data, compare the first check data with second check data; the second check data being correct check data corresponding to the $i^{th}$ tag group, and, according to the comparison result, determine whether the check data of the $i^{th}$ tag group is abnormal.

In the above solution, the memory controller is configured to acquire a boundary page line; the boundary page line including a first page line where a page of an unprogrammed state among the pages in the page lines according to the programming sequence is located; and according to the address of the boundary page line, determine the address of the final encoded page of each page line in the $i^{th}$ tag group.

In the above solution, the memory controller is configured to use the address of the next page of the final encoded page of the current page line in the $i^{th}$ tag group as the address of the starting encoded page of the next page line of the current page line in an $(i+1)^{th}$ tag group.

In the above solution, the memory controller is configured to, when the comparison result shows that the first check data is the same as the second check data, determine that the check data of the $i^{th}$ tag group is not abnormal, and continue to perform the encoding operation on all pages of which the states are the programmed state in the $(i+1)^{th}$ tag group, and determine whether the check data corresponding to the $(i+1)^{th}$ tag group is abnormal, and, when the comparison result shows that the first check data is different from the second check data, correct the address of the starting encoded page of the last page line in the $i^{th}$ tag group.

In the above solution, the memory controller is configured to, when the comparison result shows that the first check data is different from the second check data, acquire the final encoded page of the last page line in an $(i-1)^{th}$ tag group, and, when the final encoded page of the last page line in the $(i-1)^{th}$ tag group is not the last page of the last page line, use the address of the first page in the next tag group of the last page of the last page line in the $(i-1)^{th}$ tag group as the address of a corrected starting encoded page of the last page line in the $i^{th}$ tag group; and perform the recoding operation on the it $i^{th}$ tag group by using the address of the corrected starting encoded page.

In the above solution, the memory controller is configured to acquire the second check data from a check cache. In the above solution, the plurality of memory planes included in the at least one memory chip may execute a programming operation at the same time. In the above solution, the memory system includes a general flash memory or a solid state disk.

The embodiments of the present disclosure further provide an operation method of a memory system, and the memory system includes: a memory apparatus and a memory controller coupled with the memory apparatus, wherein the memory apparatus includes at least one memory chip, and each memory chip includes a plurality of memory planes, each memory plane includes a plurality of pages, a plurality of pages located at the same position in each of the memory planes of the at least one memory chip form a page line, the memory apparatus includes a plurality of tag groups, each tag group includes a plurality of page lines. The operation method of the memory system includes, when the memory apparatus is powered down and then powered on, respectively performing, in sequence, a recoding operation on all pages of which the states are programmed states in each tag group in the memory apparatus, and according to an encoding result corresponding to each tag group, respectively determining whether check data corresponding to each tag group is abnormal.

In the above solution, the memory apparatus includes M tag groups, and the step of respectively performing the recoding operation on all pages of which the states are the programmed state in each tag group in the memory apparatus; and according to the encoding result corresponding to each tag group, respectively determining whether the check data corresponding to each tag group is abnormal includes, for an $i^{th}$ tag group, determining the address of a starting encoded page and the address of a final encoded page of each page line in the $i^{th}$ tag group, the starting encoded page including a first programmed page in each page line in the $i^{th}$ tag group according to a programming sequence, and the final encoded page including a last programmed page in each page line in the $i^{th}$ tag group according to the programming sequence; both M and i are integers, and $0 \leq i < M$, performing an encoding operation on all pages of which the addresses are located between the address of the starting encoded page and the address of the final encoded page in each page line in the $i^{th}$ tag group, so as to obtain first check data, comparing the first check data with second check data; the second check data being correct check data corresponding to the $i^{th}$ tag group, and according to the comparison result, determining whether the check data of the $i^{th}$ tag group is abnormal.

In the above solution, the step of determining the address of the final encoded page of each page line in the $i^{th}$ tag group includes acquiring a boundary page line; the boundary page line including a first page line where a page of an unprogrammed state among the pages in the page lines according to the programming sequence is located, and according to the address of the boundary page line, determining the address of the final encoded page of each page line in the $i^{th}$ tag group.

In the above solution, the method further includes using the address of the next page of the final encoded page of the current page line in the $i^{th}$ tag group as the address of the starting encoded page of the next page line of the current page line in an $(i+1)^{th}$ tag group.

In the above solution, the step of according to the comparison result, determining whether the check data of the $i^{th}$ tag group is abnormal includes, when the comparison result shows that the first check data is the same as the second check data, determining that the check data of the $i^{th}$ tag group is not abnormal, and, when the comparison result shows that the first check data is different from the second check data, correcting the address of the starting encoded page of the last page line in the $i^{th}$ tag group.

The method further includes, when the check data of the $i^{th}$ tag group is not abnormal, continuing to perform the encoding operation on all pages of which the states are the programmed state in the $(i+1)^{th}$ tag group, and determining whether the check data corresponding to the $(i+1)^{th}$ tag group is abnormal.

In the above solution, the step of when the comparison result shows that the first check data is different from the second check data, correcting the address of the starting encoded page of the last page line in the $i^{th}$ tag group includes, when the comparison result shows that the first check data is different from the second check data, acquiring the final encoded page of the last page line in an $(i-1)^{th}$ tag group, when the final encoded page of the last page line in the $(i-1)^{th}$ tag group is not the last page of the last page line, using the address of the first page in the next tag group of the last page of the last page line in the $(i-1)^{th}$ tag group as the address of a corrected starting encoded page of the last page line in the $i^{th}$ tag group, and performing the recoding operation on the it tag group by using the address of the corrected starting encoded page.

In the above solution, the method further includes acquiring the second check data from a check cache.

In the embodiments of the present disclosure, after accidental power down and power on again, the recoding operation may be sequentially performed respectively on all pages of which the states are the programmed state in each tag group in the memory apparatus, so as to acquire the corresponding check data, wherein during the recoding operation process, in tag groups, the recoding operation is performed on all pages in one tag group, and then it is judged whether the check data corresponding to the current tag group is normal, and the next tag group is processed after one tag group is processed; in this way, on one hand, a reprogramming operation can be more flexible, and it is unnecessary to be limited to perform the recoding operation on all pages in sequence according to the programming sequence; and on the other hand, since one tag group corresponds to one piece of check data, when the reprogramming operation is performed on all pages in the same tag group, the number of switching times between a virtual block and the check cache can be reduced, and thus the performance of the memory system is improved.

BRIEF DESCRIPTION OF THE DRAWINGS

Various exemplary embodiments of this disclosure that are proposed as examples will be described in detail with reference to the following figures, wherein like numerals reference like elements, and wherein:

FIG. 8b is a schematic diagram of redundant array rebuild of an error correction module in FIG. 8a;

FIG. 9 is a schematic diagram of an implementation flow of an operation method of a memory system according to an exemplary embodiment of the present disclosure;

FIG. 10 is a schematic diagram of a memory apparatus having a plurality of memory planes provided in an exemplary embodiment of the present disclosure.

DETAILED DESCRIPTION

Figure 1:
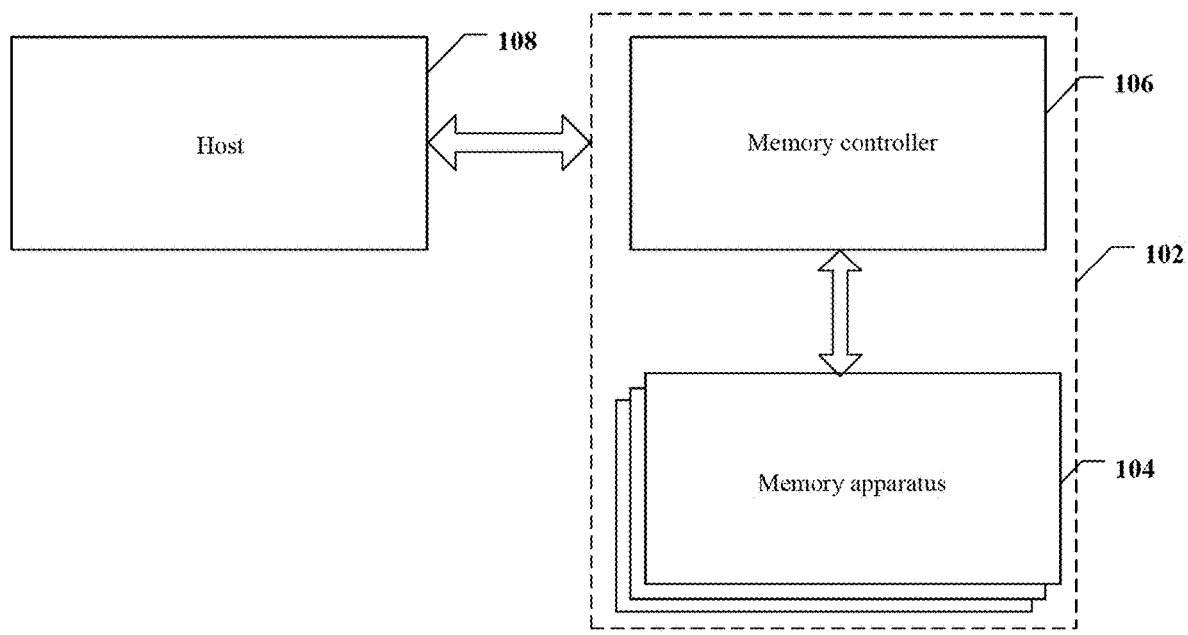
FIG. 1 is a schematic diagram of an exemplary system having a memory system according to an exemplary embodiment of the present disclosure.

Exemplary implementations of the present disclosure will be described in more detail below with reference to the drawings. Although the exemplary implementations of the present disclosure are shown in the drawings, it should be understood that, the present disclosure may be implemented in various forms and should not be limited to specific implementations set forth herein. Rather, these implementations are provided to understand the present disclosure more thoroughly, and to fully convey the scope disclosed in the present disclosure to those skilled in the art.

In the following description, numerous specific details are given to provide a more thorough understanding of the present disclosure. However, it will be apparent to those skilled in the art that, the present disclosure may be implemented without one or more of these details. In other examples, in order to avoid confusion with the present disclosure, some technical features well known in the art are not described, that is, all features of actual embodiments are not described herein, and well-known functions and structures are not described in detail.

In the drawings, the sizes of layers, areas and elements, and their relative sizes may be exaggerated for clarity. The same reference signs denote the same elements all the time.

The terms used herein are for the purpose of describing specific embodiments only and are not used as limitations to the present disclosure. As used herein, singular forms "a", "an" and "the" are intended to include plural forms as well, unless the context clearly indicates otherwise. It should also be understood that, the terms "composed" and/or "include", when used in the specification, determine the presence of features, integers, steps, operations, elements and/or components, but do not preclude the presence or addition of one or more other features, integers, steps, operations, elements, components and/or groups. As used herein, the term "and/or" includes any and all combinations of related listed items.

In order to understand the features and technical content of the embodiments of the present disclosure in more detail, the implementation of the embodiments of the present disclosure will be described in detail below in combination with the drawings, and the appended drawings are for reference only and are not intended to define the embodiments of the present disclosure.

A memory apparatus in the embodiments of the present disclosure includes, but is not limited to, a three-dimensional NAND memory, and in order to facilitate understanding, the three-dimensional NAND memory is taken as an example for illustration.

FIG. 1 illustrates a block diagram of an exemplary system 100 having a memory apparatus in some aspects of the present disclosure. The system 100 may be a mobile phone, a desktop computer, a laptop computer, a tablet computer, a vehicle computer, a game console, a printer, a positioning device, a wearable electronic device, a smart sensor, a virtual reality (VR) device, an augmented reality (AR) device, or any other suitable electronic devices having storage therein. As shown in FIG. 1, the system 100 may include a host 108 and a memory system 102, and the memory system 102 has one or more memory apparatuses 104 and a memory controller 106. The host 108 may be a processor (e.g., a central processing unit (CPU)) or a system on chip (SoC) (e.g., an application processor (AP)) of the electronic device. The host 108 may be configured to send data to the memory apparatus 104 or receive data from the memory apparatus 104.

According to some implementations, the memory controller 106 is coupled with the memory apparatus 104 and the host 108, and is configured to control the memory apparatus 104. The memory controller 106 may manage data stored in the memory apparatus 104 and communicate with the host 108. In some implementations, the memory controller 106 is designed to operate in a low duty cycle environment, such as a secure digital (SD) card, a compact flash (CF) card, and a universal serial bus (USB) flash driver, or other media for use in electronic devices such as personal calculators, digital cameras, mobile phones, etc. In some implementations, the memory controller 106 is designed to operate in a high duty cycle environment SSD or an embedded multimedia card (eMMC), the SSD or eMMC serves as a data storage and an enterprise storage array of mobile devices such as smartphones, tablet computers, laptop computers, etc.

The memory controller 106 may be configured to control operations of the memory apparatus 104, such as reading, erasing and programming operations. The memory controller 106 may also be configured to manage various functions regarding data that is stored in or to be stored in the memory apparatus 104, including, but not limited to, bad block management, garbage collection, logic address to physical address transformation, wear-leveling, etc. In some implementations, the memory controller 106 is further configured to process an error correction code (ECC) with respect to data that is read from the memory apparatus 104 or written into the memory apparatus 104. The memory controller 106 may also execute any other suitable functions, such as formatting the memory apparatus 104. The memory controller 106 may communicate with an external device (e.g., the host 108) according to a particular communication protocol. For example, the memory controller 106 may communicate with the external device through at least one of various interface protocols, such as a USB protocol, an MMC protocol, a periphery component interconnect (PCI) protocol, a PCI express (PCI-E) protocol, an advanced technology attachment (ATA) protocol, a serial ATA protocol, a parallel ATA protocol, a small computer small interface (SCSI) protocol, an enhanced small disk interface (ESDI) protocol, an integrated drive electronics (IDE) protocol, a Firewire protocol, etc.

Figure 2A:
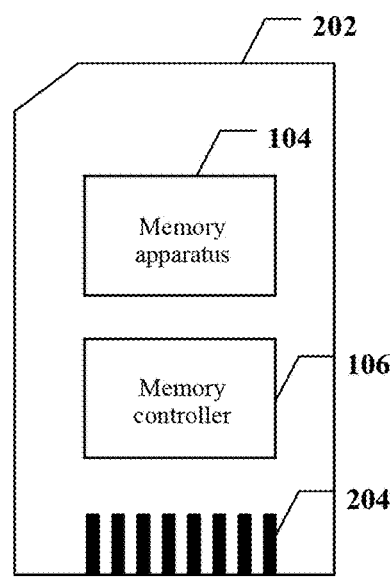
FIG. 2a is a schematic diagram of an exemplary memory card having a memory system according to an exemplary embodiment of the present disclosure.

The memory controller 106 and one or more memory apparatuses 104 may be integrated into various types of storage devices, for example, being included in the same package (e.g., a universal flash storage (UFS, Universal Flash Storage) package or an eMMC package). That is, the memory system 102 may be implemented and packaged into different types of terminal electronic products. In one example as shown in FIG. 2a, the memory controller 106 and a single memory apparatus 104 may be integrated into a memory card 202.

Figure 2B:
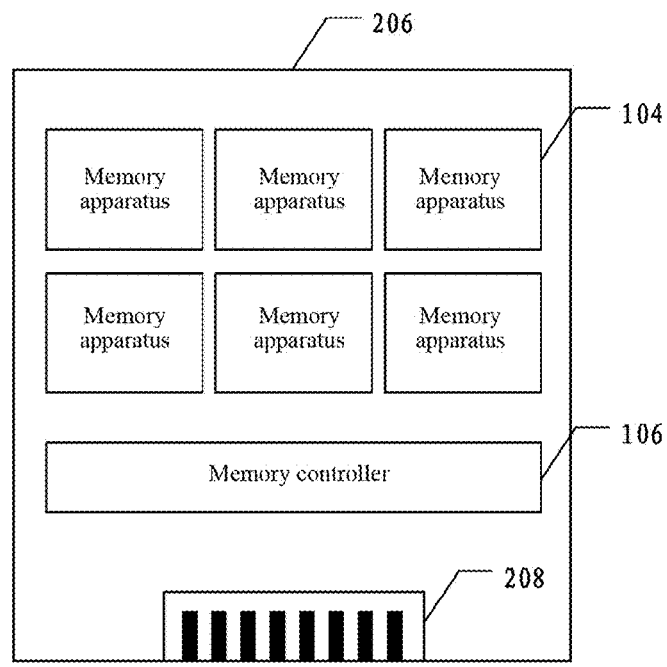
FIG. 2b is a schematic diagram of an exemplary solid state driver having a memory system according to an exemplary embodiment of the present disclosure.

The memory card 202 may include a PC card (PCMCIA, Personal Computer Memory Card International Association), a CF card, a smart media (SM) card, a memory stick, a multimedia card (MMC, RS-MMC, MMCmicro), an SD card (SD, miniSD, microSD, SDHC), a UFS, etc. The memory card 202 may also include a memory card connector 204 for coupling the memory card 202 to a host (e.g., the host 108 in FIG. 1). In another example as shown in FIG. 2b, the memory controller 106 and a plurality of memory apparatuses 104 may be integrated into an SSD 206. The SSD 206 may also include an SSD connector 208 for coupling the SSD 206 to a host (e.g., the host 108 in FIG. 1). In some implementations, the storage capacity and/or operating speed of the SSD 206 is greater than the storage capacity and/or operating speed of the memory card 202.

Figure 3A:
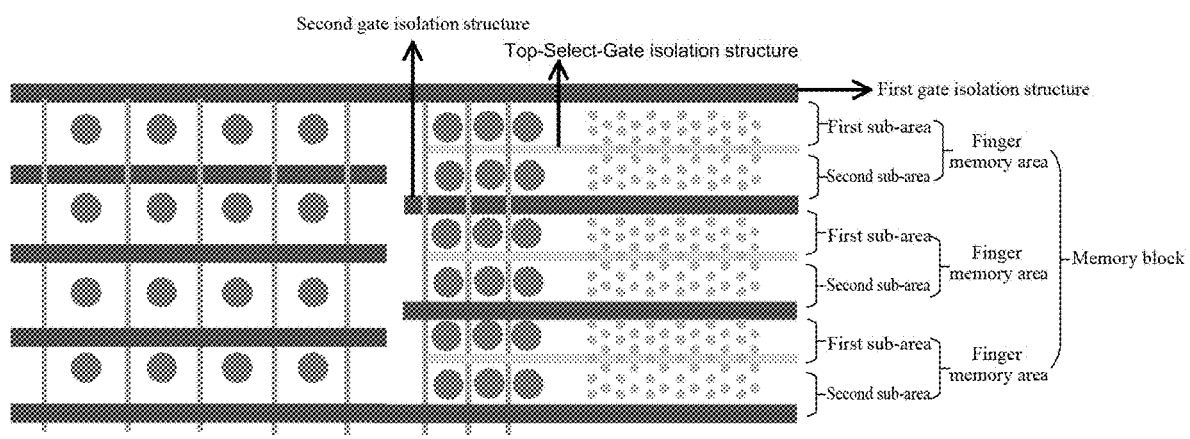
FIG. 3a is a schematic diagram of distribution of memory cells of a three-dimensional NAND memory according to an exemplary embodiment of the present disclosure.

FIG. 3a exemplarily illustrates a schematic structural diagram of a memory array of a three-dimensional NAND memory, as shown in FIG. 3a, the memory array of the three-dimensional NAND memory is composed of several rows of memory cells, which are staggered in parallel and are parallel to a gate isolation structure, every two rows of memory cells are spaced apart by the gate isolation structure and an Top-Select-Gate isolation structure, and each row of memory cells includes a plurality of memory cells. The gate isolation structure may include a first gate isolation structure and second gate isolation structures, the first gate isolation structure divides the memory array into a plurality of memory blocks (the English expression of which is Block), a plurality of second gate isolation structures may divide the memory blocks into a plurality of finger memory areas (the English expression of which is Finger), and the Top-Select-Gate isolation structure disposed at the middle of each finger memory area may divide the finger memory area into two sub-areas, exemplarily including a first sub-area and a second sub-area. One memory block shown in FIG. 3a includes six memory slices, and in practical applications, the number of memory slices in one memory block is not limited thereto.

In some embodiments, each memory block may be coupled with a plurality of word lines, a plurality of memory cells, which is coupled with each individually controlled word line, constitute a page (the English expression of which is Page), and exemplarily, all memory cells in each memory slice in FIG. 3a are coupled with each other, so as to form one page.

It should be noted that, the number of rows of memory cells between the gate isolation structure and the Top-Select-Gate isolation structure given in FIG. 3a is merely exemplary, and is not used to limit the number of rows of memory cells included in one finger memory area of the three-dimensional NAND memory in the present disclosure. In practical applications, the number of rows of memory cells included in one finger memory area may be adjusted according to actual situations, such as 2, 4, 8 and 16, etc.

Figure 3B:
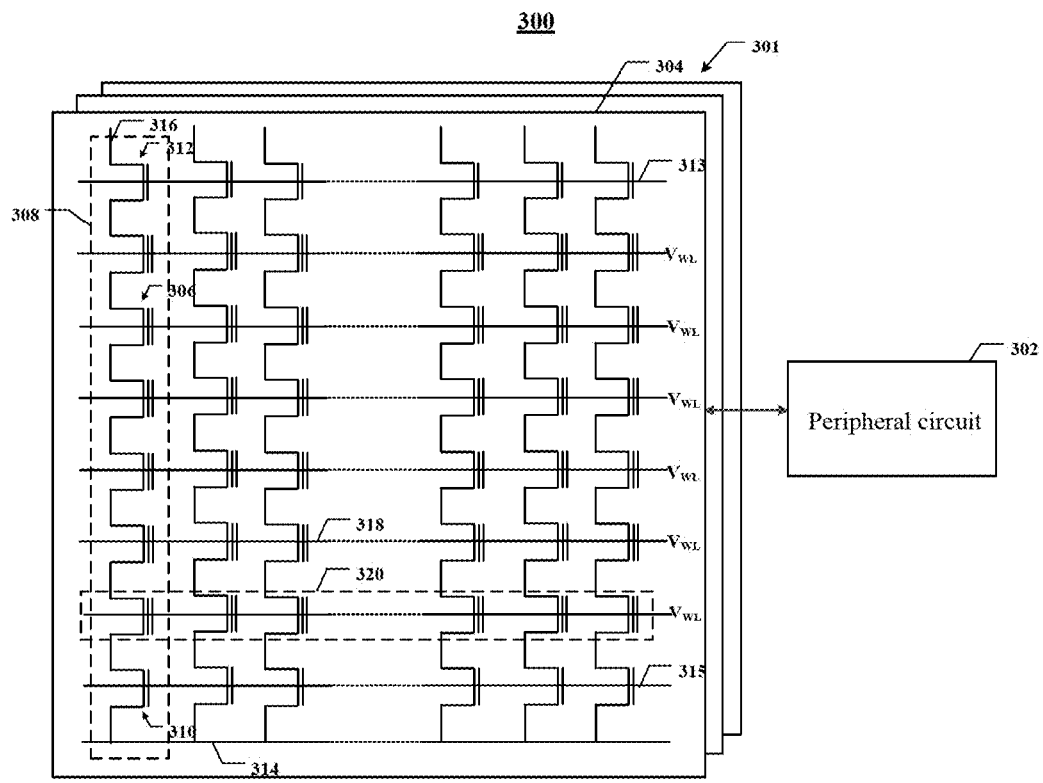
FIG. 3b is a schematic diagram of an exemplary memory apparatus including a peripheral circuit according to an exemplary embodiment of the present disclosure.

FIG. 3b illustrates a schematic circuit diagram of an exemplary memory apparatus 300 including a peripheral circuit according to some aspects of the present disclosure. The memory apparatus 300 may be an example of the memory apparatus 104 in FIG. 1. The memory device 300 may include a memory array 301 and a peripheral circuit 302 coupled to the memory array 301. It is taken as an example for illustration that the memory array 301 is a three-dimensional NAND memory array, wherein memory cells 306 are provided in the form of an array of NAND memory strings 308, and each NAND memory string 308 extends vertically above a substrate (not shown). In some implementations, each NAND memory string 308 includes a plurality of memory cells 306 that are coupled in series and stacked vertically. Each memory cell 306 may maintain a continuous analog value, such as a voltage or charge, depending on the number of electrons trapped within the area of the memory cell 306. Each memory cell 306 may be a floating gate type memory cell including a floating gate transistor, or a charge trap type memory cell including a charge trap transistor.

In some implementations, each memory cell 306 is a single-level cell (SLC, Single-level Cell) that has two possible memory states and thus may store one bit of data. For example, a first memory state "0" may correspond to a first voltage range, and a second memory state "1" may correspond to a second voltage range. In some implementations, each memory cell 306 is a multi-level cell (MLC, Multi-Level Cell) that is capable of storing more than a single bit of data in more than four memory states. For example, the MLC may store two bits per cell, three bits per cell (also referred to as a trinary-level cell (TLC, Trinary-Level Cell)), four bits per cell (also referred to as a quad-level cell (QLC, Quad-Level Cell)), or five bits per cell (also referred to as a penta-level cell (PLC, Penta-level Cell)). Each MLC may be programmed to take the range of possible nominal memory values. In one example, if each MLC stores two bits of data, the MLC may be programmed to write one of three possible nominal memory values into the cell, so as to take one of three possible programming levels from an erase state. A fourth nominal memory value may be used for the erase state.

As shown in FIG. 3b, each NAND memory string 308 may include a Bottom-Select-Gate (BSG) 310 at its source end and an Top-Select-Gate (TSG) 312 at its drain end. The BSG 310 and the TSG 312 may be configured to activate selected NAND memory strings 308 during reading and programming operations. In some implementations, the sources of the NAND memory strings 308 in the same memory block 304 are coupled by the same source line (SL) 314 (e.g., a common SL). In other words, according to some implementations, all NAND memory strings 308 in the same memory block 304 have an array common source (ACS). According to some implementations, the TSG 312 of each NAND memory string 308 is coupled to a corresponding bit line (BL) 316, and data may be read from or written into the bit line 316 via an output bus (not shown). In some implementations, each NAND memory string 308 is configured to be selected or deselected by applying a select voltage (e.g., higher than a threshold voltage of a transistor with the TSG 312) or a deselect voltage (e.g., 0V) to the corresponding TSG 312 via one or more TSG lines 313 and/or by applying a select voltage (e.g., higher than the threshold voltage of a transistor with the BSG 310) or a deselect voltage (e.g., 0V) to the corresponding BSG 310 via one or more BSG lines 315.

As shown in FIG. 3b, the NAND memory strings 308 may be organized into a plurality of memory blocks 304, each of the plurality of memory blocks 304 may have a common source line 314 (e.g., coupled to ground). In some implementations, each memory block 304 is a basic data unit for an erase operation, that is, all memory cells 306 on the same memory block 304 are erased simultaneously. To erase the memory cells 306 in a selected memory block 304, an erase voltage (Vers) (e.g., a high positive voltage (e.g., 20V or higher)) may be used to bias source lines 314, which are coupled to the selected memory block 304 and unselected memory blocks 304 on the same plane as the selected memory block 304. It should be understood that, in some examples, an erase operation may be performed at a half-memory-block level, at a quarter-memory-block level, or at a level having any suitable number of memory blocks or any suitable fraction of the memory blocks. The memory cells 306 of adjacent NAND memory strings 308 may be coupled by word lines 318, and the word lines 318 select which row of the memory cells 306 is affected by the reading and programming operations. In some implementations, each word line 318 is coupled to a page 320 of the memory cell 306, and the page 320 is a basic data unit for the programming operation. The size of one page 320 in bits may be related to the number of NAND memory strings 308, which are coupled by the word lines 318, in one memory block 304. Each word line 318 may include a plurality of control gates (gate electrodes) at each memory cell 306 in the corresponding page 320, and a gate line for coupling the control gates. In combination with foregoing FIG. 3a, one page 320 contains a plurality of memory cells 306, and the plurality of memory cells are spaced apart by the Top-Select-Gate isolation structure and the gate isolation structure, the plurality of memory cells between the Top-Select-Gate isolation structure and the gate isolation structure are arranged to form a plurality of memory cell rows, and each memory cell row is parallel to the gate isolation structure and the Top-Select-Gate isolation structure. The memory cells in the memory slices sharing the same word line form a programmable (/writable) page.

Figure 3C:
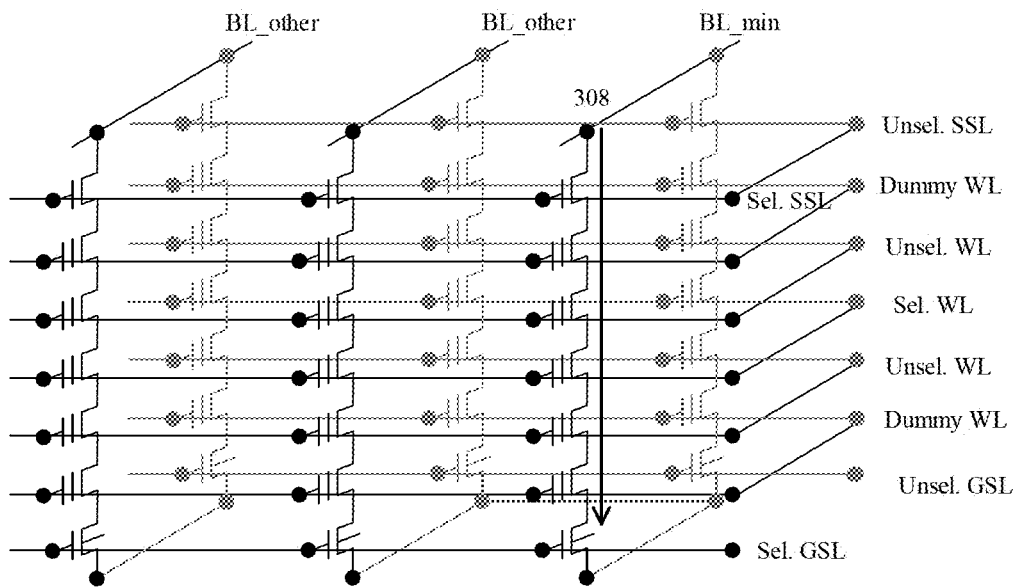
FIG. 3c is a schematic structural diagram of a memory string, a word line and a bit line in a memory apparatus according to another exemplary embodiment of the present disclosure.

Referring to FIG. 3a, FIG. 3b and FIG. 3c, each memory cell 306 among the plurality of memory cells is coupled to a corresponding word line 318, and each memory string 308 is coupled to a corresponding bit line 316 by a corresponding selection transistor (e.g., the Top-Select-Transistor (TSG) 312).

Specifically, referring to FIG. 3c, the memory apparatus may include one or more storage strings 308 (shown by arrows in FIG. 3c), each storage string may include an Upper-Select-Transistor SST corresponding to an Upper-Select-Transistor gate line SSL, a Ground-Select-Transistor GST corresponding to a Lower-Select-Transistor gate line GSL, and a plurality of memory cells located between the Upper-Select-Transistor and the Ground-Select-Transistor, and each storage string is respectively connected to a corresponding bit line BL and a unified common source line.

Here, referring to FIG. 3c, the word line coupled with a selected page is a selected word line (Sel.WL), the selected word line may be any word line among a plurality of word lines in the memory apparatus, and other word lines are unselected word lines (Usel.WL) or dummy word lines (Dummy WL); the bit lines BL in the memory apparatus are divided into two parts, a part of bit lines is connected to a memory cell in a lowest state (i.e., an erase state) among the memory cells coupled with the selected word line, and is denoted as first bit lines (BL min), and the other part of bit lines is connected to memory cells other than the memory cell in the lowest state (i.e., the erase state) and memory cells that have reached a target state, among the memory cells coupled with the selected word line, and is denoted as second bit lines (BL other), and in practical operations, a certain target memory cell among a plurality of memory cells may be selected by selecting a corresponding word line and a corresponding bit line, so as to execute corresponding reading and programming operations.

Figure 4:
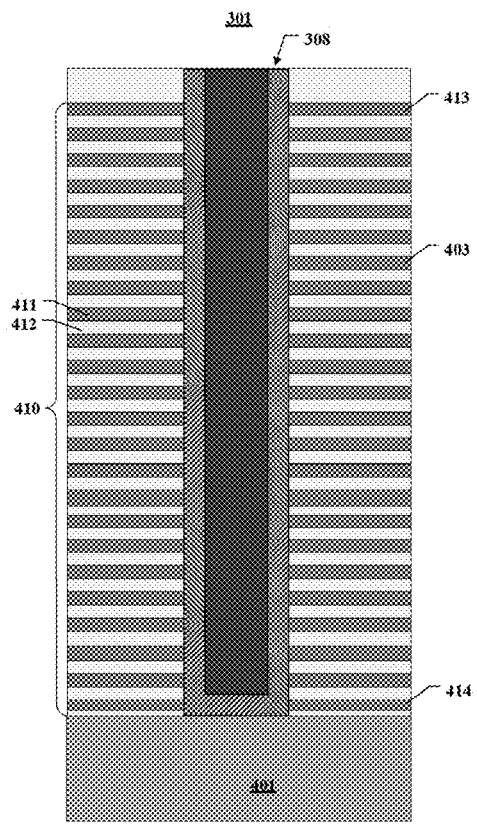
FIG. 4 is a schematic cross-sectional view of a memory array including a NAND memory string according to an exemplary embodiment of the present disclosure.

FIG. 4 illustrates a schematic cross-sectional view of an exemplary memory array 301 including a NAND memory string 308 according to some aspects of the present disclosure. As shown in FIG. 4, the NAND memory string 308 may include a stacked structure 410, and the stacked structure 410 includes a plurality of gate layers 411 and a plurality of insulating layers 412, which are alternately stacked in sequence, and a memory string 308 vertically penetrating through the gate layers 411 and the insulating layers 412.

The gate layers 411 and the insulating layers 412 may be alternately stacked, and two adjacent gate layers 411 are spaced apart by one insulating layer 412. The number of pairs of the gate layers 411 and the insulating layers 412 in the stacked structure 410 may be used to determine the number of memory cells included in a memory array 401.

The constituent material of the gate layer 411 may include a conductive material. The conductive material includes, but is not limited to, tungsten (W), cobalt (Co), copper (Cu), aluminum (Al), polysilicon, doped silicon, silicide, or any combination thereof. In some implementations, each gate layer 411 includes a metal layer, for example, a tungsten layer. In some implementations, each gate layer 411 includes a doped polysilicon layer. Each gate layer 411 may include a control gate surrounding the memory cell. The gate layer 411 at the top of the stacked structure 410 may extend laterally to serve as an Top-Select-Gate line, the gate layer 411 at the bottom of the stacked structure 410 may extend laterally to serve as a Bottom-Select-Gate line, and the gate layer 411 extending laterally between the Top-Select-Gate line and the Bottom-Select-Gate line may serve as a word line layer.

In some embodiments, the stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other suitable materials.

In some embodiments, the NAND memory string 308 includes a channel structure extending vertically through stacked structure 410. In some implementations, the channel structure includes a channel hole filled with (one or more) semiconductor materials (e.g., as semiconductor channels) and (one or more) dielectric materials (e.g., as memory films). In some implementations, the semiconductor channel includes silicon, for example, polysilicon.

In some implementations, the memory film is a composite dielectric layer that includes a tunneling layer, a memory layer (also referred to as a "charge trap/memory layer") and a blocking layer. The channel structure may have a cylindrical shape (e.g., a column shape).

According to some implementations, the semiconductor channel, the tunneling layer, the memory layer and the blocking layer are disposed radially from the center of the column toward the outer surface of the column in this order. The tunneling layer may include silicon oxide, silicon oxynitride, or any combination thereof. The memory layer may include silicon nitride, silicon oxynitride, or any combination thereof. The blocking layer may include silicon oxide, silicon oxynitride, a dielectric with a high dielectric constant (high k), or any combination thereof. In one example, the memory film may include a composite layer of silicon oxide/silicon oxynitride/silicon oxide (ONO).

Referring back to FIG. 3b, the peripheral circuit 302 may be coupled to the memory array 301 via the bit line 316, the word line 318, the source line 314, the BSG line 315 and the TSG line 313. The peripheral circuit 302 may include any suitable analog, digital and hybrid signal circuits, so as to promote an operation of the memory array 301 by means of applying a voltage signal and/or a current signal to each target memory cell 306 and sensing the voltage signal and/or the current signal from each target memory cell 306 via the bit line 316, the word line 318, the source line 314, the BSG line 315 and the TSG line 313. The peripheral circuit 302 may include various types of peripheral circuits formed by using the metal-oxide-semiconductor (MOS) technology. For example, FIG. 5 illustrates some exemplary peripheral circuits, the peripheral circuit 302 includes a page buffer/sense amplifier 504, a column decoder/bit line driver 506, a row decoder/word line driver 508, a voltage generator 510, a control logic 512, a register 514, an interface 516 and a data bus 518.

Figure 5:
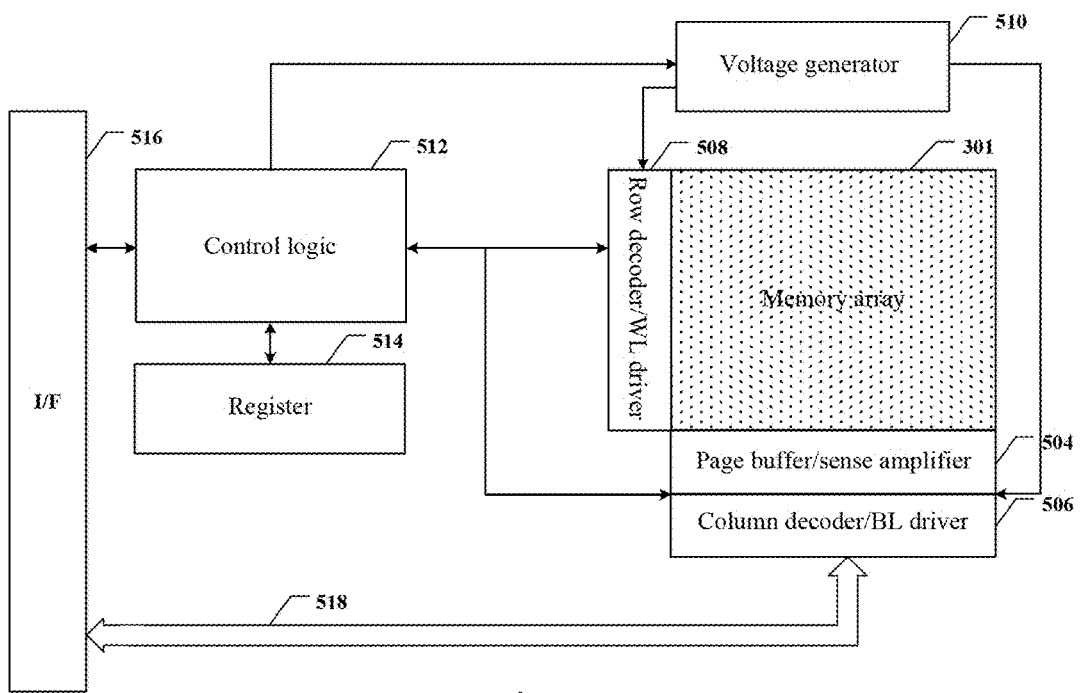
FIG. 5 is a schematic diagram of an exemplary memory apparatus including a memory cell array and a peripheral circuit according to an exemplary embodiment of the present disclosure.

It should be understood that, in some examples, additional peripheral circuits not shown in FIG. 5 may also be included.

The page buffer/sense amplifier 504 may be configured to read data from the memory array 301 and program (write) data into the memory array 301 according to a control signal from the control logic 512. In one example, the page buffer/sense amplifier 504 may store a page of programmed data (written data) to be programmed into one page 320 of the memory array 301. In another example, the page buffer/sense amplifier 504 may execute a programming verification operation, so as to ensure that data has been correctly programmed into the memory cell 306, which is coupled to the selected word line 318. In yet another example, the page buffer/sense amplifier 504 may also sense a low-power signal that is from the bit line 316 and represents a data bit stored in the memory cell 306, and amplify a small voltage swing to an identifiable logic level in a read operation. The column decoder/bit line driver 506 may be configured to be controlled by the control logic 512, and select one or more NAND memory strings 308 by applying a bit line voltage generated from the voltage generator 510.

The row decoder/word line driver 508 may be configured to be controlled by the control logic 512, and select/deselect the memory block 304 of the memory array 301 and select/deselect the word line 318 of the memory block 304. The row decoder/word line driver 508 may also be configured to drive the word line 318 by using a word line voltage generated from the voltage generator 510. In some implementations, the row decoder/word line driver 508 may also select/deselect, and drive the BSG line 315 and the TSG line 313. As described in detail below, the row decoder/word line driver 508 is configured to execute a programming operation on the memory cell 306 coupled to (one or more) selected word lines 318. The voltage generator 510 may be configured to be controlled by the control logic 512, and generate the word line voltage (e.g., a read voltage, a programming voltage, a pass voltage, a channel boost voltage, a verification voltage, etc.), the bit line voltage and a source line voltage to be supplied to the memory array 301.

In some specific embodiments, the programming operation may include a plurality of phases, exemplarily, the programming operation may include a channel pre-charging phase, a channel boost phase, a programming pulse phase and a recovery phase. In the channel pre-charging phase, the voltage generator may generate a voltage required in the next phase, for example, a voltage applied to each gate, a channel boost voltage, and the like; in the channel boost phase, the channel boost voltage may be applied to the selected word line; and in the programming pulse phase, a target voltage of each programming may be applied to the selected word line. In the recovery phase, the voltages of both the unselected word lines and the selected word lines may be reduced to corresponding voltages, for example, Vcc and Vdd, the purpose of reducing the voltage to the corresponding voltage may be achieved by one or more instances of step-by-step voltage drop in the recovery phase, for example, the voltage may be first reduced to an intermediate voltage, and the intermediate voltage is maintained for a period of time and then is reduced to the corresponding voltage.

The control logic 512 may be coupled to each peripheral circuit described above and be configured to control the operation of each peripheral circuit. The register 514 may be coupled to the control logic 512, and include a state register, a command register and an address register, so as to store state information, a command operation code (OP code) and a command address for controlling the operation of each peripheral circuit. The interface 516 may be coupled to the control logic 512 and serve as a control buffer, so as to buffer a control command received from a host (not shown) and relay the same to the control logic 512, and to buffer state information received from the control logic 512 and relay the same to the host.

The interface 516 may also be coupled to the column decoder/bit line driver 506 via the data bus 518, and serve as a data I/O interface and a data buffer, so as to buffer and relay the data to the memory array 301 or relay/buffer the data from the memory array 301.

As mentioned above, in the NAND memory, according to differences in memory density, the memory cells may be divided into single-level cells (one-bit memory cells), double-level cells (two-bit memory cells), trinary-level cells (three-bit memory cells), quad-level cells (four-bit memory cells), and penta-level cells (five-bit memory cells), here and below, in order to clearly understand the concept of the invention of the present disclosure, the single-level cell (SLC) is taken as an example for illustration. However, it should be understood that, the number of memory bits in each memory cell mentioned in the following embodiments is merely used to illustrate the present disclosure, and is not intended to limit the scope of the present disclosure.

Figure 6:
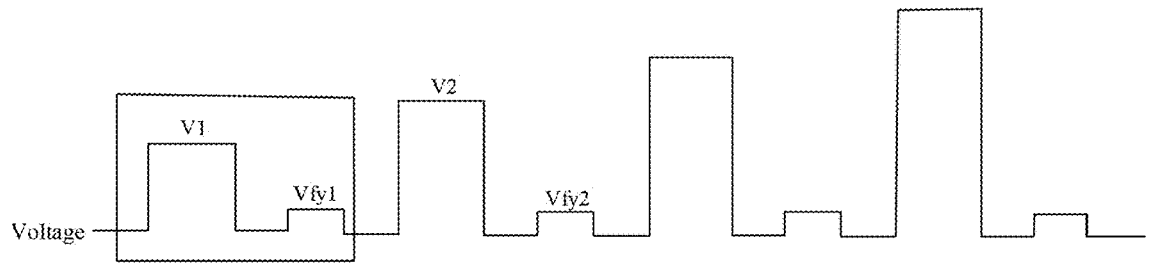
FIG. 6 is a schematic diagram of a data programming process provided in an exemplary embodiment of the present disclosure.

Generally, incremental step-pulse programming (ISPP, Incremental Step-Pulse Programming) may be used to perform a programming (writing) operation on the NAND memory, the programming process may include a plurality of cycles, each cycle is generally divided into a programming phase and a verification phase, wherein in the programming phase, a programming voltage (Vpgm) is applied to a selected page in the memory apparatus, so as to write data, and in the verification phase, a verification voltage (Verify) is applied to the selected page, so as to verify whether the programming voltage thereof reaches a threshold voltage (Vt) of the memory cell corresponding to the selected page; in practical applications, the programming voltages in the plurality of cycles are progressively increased; and exemplarily, referring to FIG. 6, a programming voltage V1 is first applied to a selected word line, and then a verification voltage Vfy 1 is applied to verify whether the programming voltage thereof reaches a corresponding threshold voltage. If the programming voltage has reached the threshold voltage, the programming operation ends. If the programming voltage does not reach the threshold voltage, the next programming voltage V2 (wherein the voltage of V2 will have a certain increment on the basis of V1) is used for programming, and the next verification voltage Vfy 2 is used for verification. The process of applying the programming voltage and verifying the voltage above is repeated, until the number of memory cells that are not programmed to the threshold voltage is within an allowable range, and the programming operation of the entire page ends.

To facilitate the evaluation of the number of memory cells in the page that are programmed to the target threshold voltage after a programming voltage is applied to the page, a failed bit count (FBC, Failed Bit Count) is introduced, and the failed bit count refers to the number of bits in the page that is not programmed to the threshold voltage. In practical applications, when programming verification is performed, it is possible to determine whether the programming is passed according to a size relationship between the failed bit count and a target failed bit count.

Exemplarily, if the failed bit count of the page is greater than the target failed bit count (that is, the failed bit count of the page is not within the allowable range of the target failed bit count), then a higher programming voltage needs to be reapplied again, and programming and verification are performed again after the programming pulse is applied.

The above process of applying the programming voltage and performing verification is repeated, until the failed bit count of the page is less than or equal to the target failed bit count (that is, the failed bit count of the page is within the allowable range of the target failed bit count), and the programming of the entire page ends.

In some embodiments, in the process of executing a programming operation, before being stored in the memory cell, the data is subjected to a redundant array encoding operation, so as to form check data, for example, parity data (Parity Data), here, the parity check is a method for verifying the correctness of code transmission, which is to perform check according to whether the number of "1" in the bits of a group of transmitted binary codes is an odd number or an even number. If an odd number is used, the check is called odd parity check, and on the contrary, if an even number is used, the check is called even parity check. Which check mode is utilized is specified in advance. A parity check bit is typically and specifically set and is used to make the number of "1" in the group of codes be an odd number or an even number. If odd parity check is used, upon receiving this group of codes, a receiving end checks whether the number of "1" is an odd number, thereby determining the correctness of code transmission, and the data stored in the parity check bit is referred to as parity data. It should be understood that, the parity data may be stored in some memory cells in the memory apparatus, and these memory cells are not used to store actual data but rather to store the parity data. In addition, the parity data may also be stored in a check cache of the memory controller, so that when an error occurs in some stored data, error correction and data recovery may be performed on the error data by means of the check data stored in the parity check bit or the check cache.

In the process of executing the programming operation, when a sudden event such as power down or the like occurs in the memory system, data that is being programmed into the memory cell and parity data corresponding to the data may be affected. After the memory system is powered on again, the memory controller executes a recoding operation on the stored data, generally uses a redundant array rebuild (RAID Rebuild) method to read the stored parity data from a virtual block (VB, Virtual Block) in the memory apparatus, judges which memory cells (or pages in the memory cells) in the memory apparatus require recoding on the basis of related information, and then sequentially reads corresponding pages to complete corresponding encoding. In some embodiments, firmware (Firmware) may recode corrupted or lost parity data. It should be noted that, the virtual block is composed of different memory chips in the memory apparatus and memory blocks at the same position in different memory planes, and the firmware generally manages the memory apparatus in virtual blocks.

Figure 7:
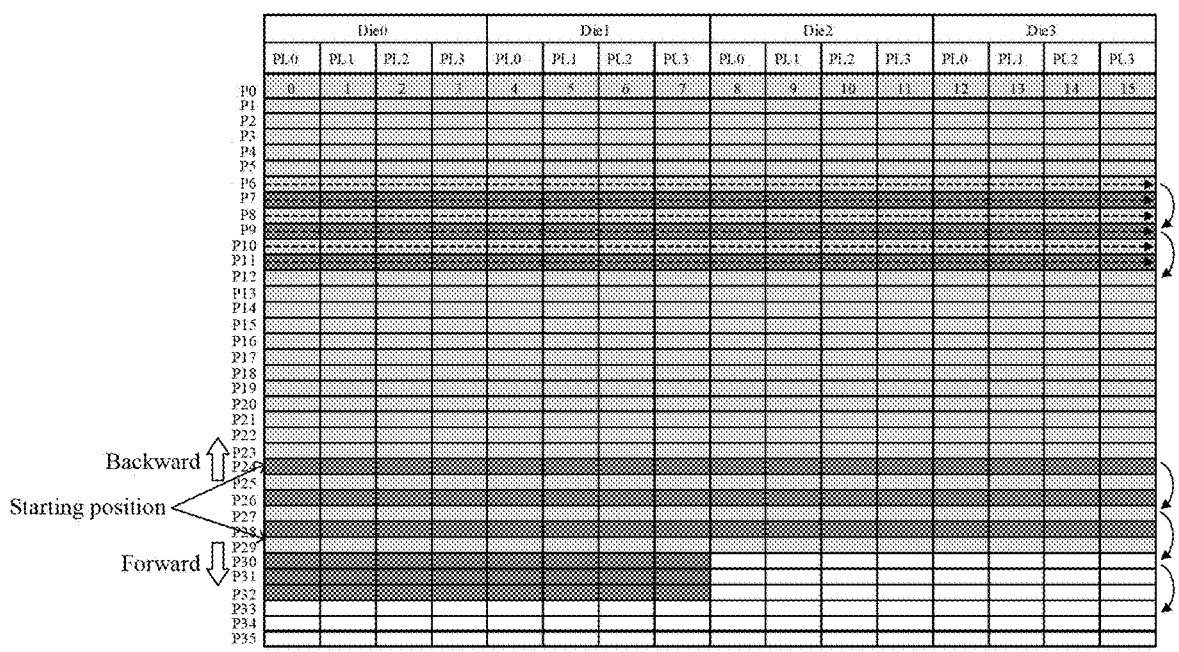
FIG. 7 is a schematic diagram of sequentially performing a recoding operation on a plurality of memory planes according to a programming sequence provided in an exemplary embodiment of the present disclosure.

In the process of performing redundant array rebuild, referring to FIG. 7, the recoding operation is usually performed according to a programming sequence (the direction of an arrow shown in FIG. 7), that is, encoding is sequentially performed from a starting page line (Page line) of the memory apparatus to an end position (starting from P0 to P35, sequentially from a page numbered 0 to a page numbered 15 in each page line); however, when the parity data is subjected to accidental power down in the process of being stored in the virtual block, the addresses of encoded pages corresponding to the parity data stored in the virtual block differ a lot, in this way, the firmware needs to find a reliable starting position for the addresses of the encoded pages with large differences, and then further divide the encoded pages into a backward (Backward) part and a forward (Forward) part to perform the recoding operation in sequence, so that the check cache and the virtual block are frequently switched, as a result, the recoding operation is complex, inefficient, easy to hide risks and difficult to maintain. It should be noted that, the programming sequence may generally include a forward programming sequence (from P35 to P0 in sequence) and a reverse programming sequence (from P0 to P35 in sequence).

Figure 8A:
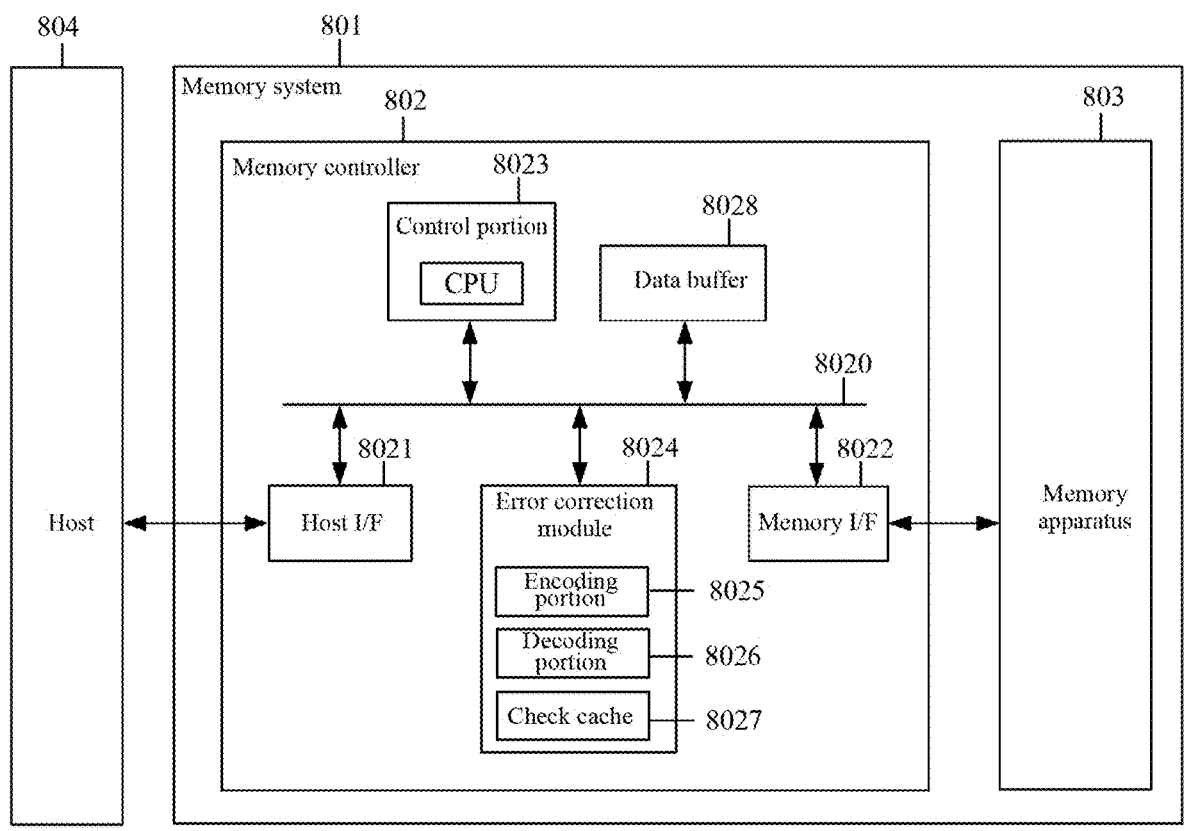
FIG. 8a is a block diagram of composition of a memory system according to an exemplary embodiment of the present disclosure.

Based on this, in order to solve one or more of the above problems, the embodiments of the present disclosure provide a memory system and an operation method thereof, as shown in FIG. 8a and FIG. 8b, the memory system includes: a memory apparatus and a memory controller coupled with the memory apparatus, wherein the memory apparatus includes at least one memory chip, and each memory chip includes a plurality of memory planes, each memory plane includes a plurality of pages, a plurality of pages located at the same position in each of the memory planes of the at least one memory chip form a page line, the memory apparatus includes a plurality of tag groups, and each tag group includes a plurality of page lines. The operation method of the memory system can include:

Step S901: when the memory apparatus is powered down and then powered on, respectively performing, in sequence, a recoding operation on all pages of which the states are programmed states in each tag group in the memory apparatus; and Step S902: according to an encoding result corresponding to each tag group, respectively determining whether check data corresponding to each tag group is abnormal.

Referring to FIG. 8a, FIG. 8a illustrates a block diagram of composition of a memory system. The memory system 801 includes a memory controller 802 and a memory apparatus 803, the memory controller 802 is to control the memory apparatus 803 to execute a read-write operation, and here, the memory controller 802 and the memory apparatus 803 may be coupled in any suitable manner. In the embodiments of the present disclosure, the memory apparatus 803 may be a semiconductor memory for storing data in a non-volatile manner, for example, a NAND memory. The memory system 801 is connected to a host 804, and the host 804 may be, for example, an electronic device such as a personal computer, a mobile terminal, etc. A host I/F 8021 outputs, to an internal bus 8020, commands and user data (written data) and the like received from the host 804, and sends, to the host 804, the user data (read data) read from the memory apparatus 803, a response from a control portion 8023, etc.

A memory I/F 8022 controls, on the basis of an instruction from the control portion 8023, the processing of writing the user data and the like into the memory apparatus 803 and the processing of reading the user data and the like from the memory apparatus 803. The control portion 8023 integrally controls the memory system 801, and the control portion 8023 is, for example, a central processing unit (CPU), a microprocessor unit (MPU), or the like.

When receiving a command from the host 804 via the host I/F 8021, the control portion 8023 performs control according to the command. For example, the control portion 8023 instructs, according to the command from the host 804, the memory I/F 8022 to write user data and parity data into the memory apparatus 803. In addition, the control portion 8023 instructs, according to the command from the host 804, the memory I/F 8022 to read the user data and the parity data from the memory apparatus 803.

An error correction (ECC) module 8024 includes an encoding portion 8025, a decoding portion 8026 and a check cache 8027, and the encoding portion 8025 encodes user data of a predetermined size written onto the same page, so as to generate parity data. The parity data is written into a page into which the user data becoming a programming basis has been written, and the decoding portion 8026 uses the parity data for decoding. The check cache 8027 is to store the parity data. The data buffer 8028 temporarily stores the user data received from the host 804 before the user data is stored in the memory apparatus 803, and temporarily saves the data read from the memory apparatus 803 before the data is sent to the host 804.

Referring to FIG. 8b, FIG. 8b is a schematic diagram of redundant array rebuild corresponding to the error correction module in FIG. 8a, wherein during a redundant array rebuild process, an exclusive or operation (the operational symbol is XOR) is generally used to perform an operation on the stored data of a plurality of pages (Page 0, Page 1, Page 2, Page 3 . . . Page 126), so as to form parity data. Therefore, by means of comparing the parity data stored in the check cache with the parity data stored in the memory apparatus (the virtual block), the abnormal parity data in the memory apparatus may be corrected, such that the stored data can be corrected, rebuilt or recovered.

The memory apparatus 803 may include one or more memory chips (Die), each memory chip may include a plurality of memory planes (Plane), and each memory plane may include a plurality of pages (Page); and all pages in the memory apparatus are numbered according to the same numbering rule. It should be noted that, for one-bit memory cells, all memory cells coupled with one word line correspond to one page; for two-bit memory cells, all memory cells coupled with one word line correspond to two pages (e.g., an upper page and a lower page); and for three-bit memory cells, all memory cells coupled with one word line correspond to three pages (e.g., an upper page, a middle page and a lower page); and so on.

Figure 10:
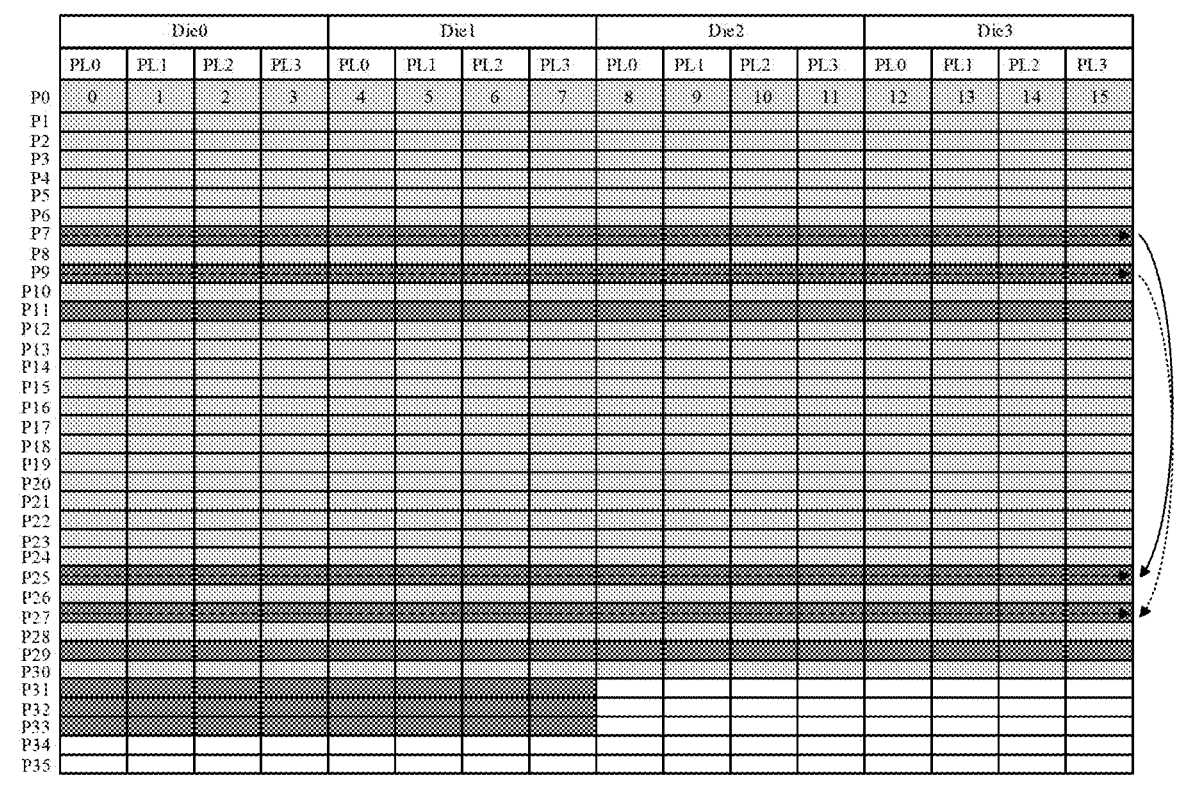

Exemplarily, referring to FIG. 10, the memory apparatus includes four memory chips, that is, a memory chip 0 (Die 0), a memory chip 1 (Die 1), a memory chip 2 (Die 2) and a memory chip 3 (Die 3), and each memory chip includes four memory planes, that is, a memory plane 0 (PL0), a memory plane 1 (PL1), a memory plane 2 (PL2) and a memory plane 3 (PL3); and each memory plane includes 36 pages, that is, an 0th page to a 35th page.

It should be noted that, each memory plane may include 64, 128, 256, 512, 1024 or 1152 pages, and so on, only 36 pages are exemplarily shown in FIG. 10, in addition, the memory cell shown in FIG. 10 is a three-bit memory cell, but it should be understood that, here and below, the storage bits included in the memory cell are only used to illustrate the present disclosure, and are not used to limit the scope of the present disclosure.

A plurality of pages located at the same position in each memory plane in the memory apparatus constitute a page line (Page line); that is, the plurality of pages in each memory plane are digitally numbered according to the same numbering rule, so that each page in each memory plane has a different serial number; at this time, each memory plane among the plurality of memory planes has pages with the same serial number, a plurality of pages having the same serial number form a page line, and the page line is also referred to as a storage page row in other embodiments.

Exemplarily, the 0th pages are present in the memory plane 0, the memory plane 1, the memory plane 2 and the memory plane 3 in the memory chip 0, the memory chip 1, the memory chip 2 and the memory chip 3 shown in FIG. 10, at this time, all the 0th pages form a page line (P0), and the memory apparatus shown in FIG. 10 includes 36 page lines (P0-P35). In addition, it can be understood that, among the plurality of page lines shown in FIG. 10, each page line includes 16 pages (numbered 0-15, and each grid represents one page).

In another aspect, the memory apparatus may be further grouped according to a tag group (Tag), wherein the memory apparatus may include a plurality of tag groups, and each tag group includes a plurality of page lines. Exemplarily, the memory apparatus includes 72 page lines, the serial numbers of the page lines are P0, P1, P1, . . . P69, P70 and P71 in sequence; the 72 page lines correspond to 18 tag groups, respectively, wherein the first tag group (Tag 1) includes the 0th page line (P0), the 18th page line (P18), the 36th page line (P36) and the 54th page line (P54); the second tag group (Tag 2) includes the first page line (P1), the 19th page line (P19), the 37th page line (P37) and the 55th page line (P55); the third tag group (Tag 3) includes the second page line (P2), the 20th page line (P20), the 38th page line (P38) and the 56th page line (P56); and the 18th tag group (Tag 18) includes the 17th page line (P17), the 35th page line (P35), the 53th page line (P53) and the 71th page line (P71).

It should be noted that, the page lines in the same tag group (Tag) correspond to the same parity data.

Figure 11:
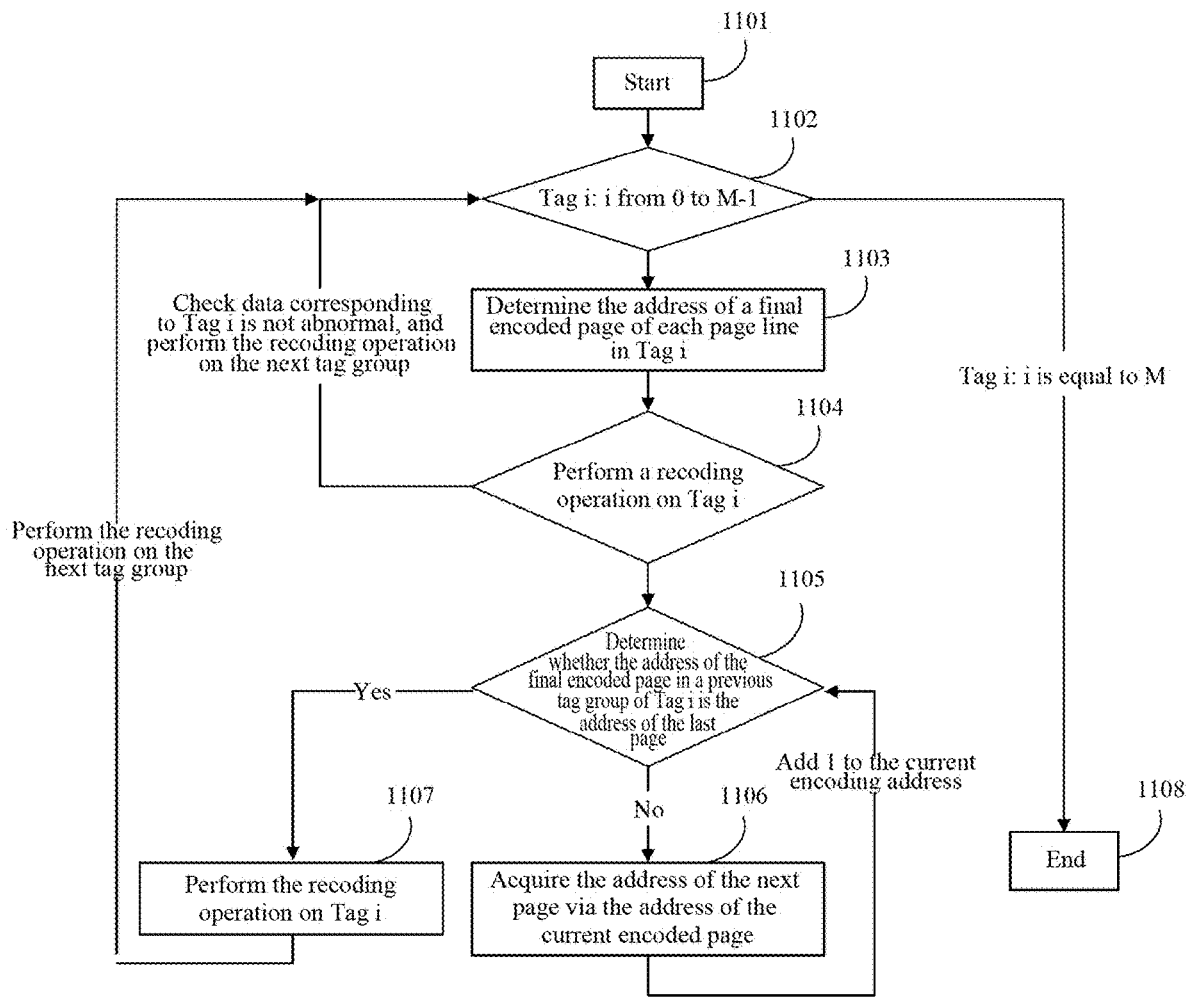
FIG. 11 is a schematic flow diagram of a recoding operation provided in an exemplary embodiment of the present disclosure.

Next, whether the parity data in the memory apparatus is abnormal is confirmed, wherein in step S901, referring to FIG. 9, each tag group includes a plurality of page lines, each page line includes a plurality of pages, the state of each page may be divided into two types, namely, an erased state and a programmed state, here, the memory controller respectively performs the recoding operation on all pages in the programmed state among the plurality of pages, and FIG. 11 illustrates a schematic flow diagram of the recoding operation; and then, in step S902, after the memory apparatus is powered down and then powered on, it is determined according to an encoding result that whether the parity data stored in the memory apparatus is abnormal. It should be noted that, the recoding operation may be understood as performing a logic operation (such as an exclusive or operation) on the data in the plurality of pages, so as to obtain check data for error correction or correction.

The recoding operation is described in detail below with reference to FIG. 11.

In some embodiments, the memory apparatus includes M tag groups, and the step of respectively performing the recoding operation on all pages of which the states are the programmed state in each tag group in the memory apparatus, and according to the encoding result corresponding to each tag group, respectively determining whether the check data corresponding to each tag group is abnormal includes for an ith tag group, determining the address of a starting encoded page and the address of a final encoded page of each page line in the ith tag group, the starting encoded page including a first programmed page in each page line in the ith tag group according to a programming sequence, and the final encoded page including a last programmed page in each page line in the ith tag group according to the programming sequence; both M and i are integers, and 0≤i<M, performing an encoding operation on all pages of which the addresses are located between the address of the starting encoded page and the address of the final encoded page in each page line in the ith tag group, so as to obtain first check data, comparing the first check data with second check data; the second check data being correct check data corresponding to the ith tag group, and, according to a comparison result, determining whether the check data of the ith tag group is abnormal.

Exemplarily, referring to FIG. 10, each tag group among the M tag groups includes a plurality of page lines, wherein the ith tag group may be any one of the M tag groups. It should be noted that, the memory apparatus shown in FIG. 10 includes 18 tag groups, and each tag group includes two page lines; however, it should be understood that, more tag groups or more page lines are further disposed in the memory apparatus, which will not be illustrated one by one herein.

Referring to FIG. 11, start execution of the recoding operation (step 1101): determining the number of tag groups included in the memory apparatus, and execute the following operations from the first tag group to the penultimate label group (M−1) (step 1102); wherein for the ith tag group (Tag i), firstly, it is necessary to first determine the address of the starting encoded page and the address of the final encoded page of each page line; wherein the address of the starting encoded page is the address of the first programmed page in each page line, and the address of the final encoded page is the address of the last programmed page sorted in sequence according to the programming sequence. It should be noted that, the programming sequence mentioned herein may be understood as a sequence of sequential sorting according to the same numbering rule. Exemplarily, according to a forward programming sequence means from P35 to P0 in sequence, and according to a reverse programming sequence means from P0 to P35 in sequence; and there is no requirement for forward programming or reverse programming herein.

Exemplarily, it is taken as an example that, i=8, and the memory apparatus includes 36 page lines (P0-P35), referring to FIG. 10, the eighth tag group includes the page line P7 and the page line P25, and all pages in the page line P7 and the page line P25 are programmed; therefore, the starting encoded page of each page line in the page line P7 and the page line P25 is the first page (a page numbered 0) in the corresponding page line, and in other words, the addresses of the starting encoded pages in the page line P7 and the page line P25 are the addresses of the pages numbered 0. The final encoded page of each page line in the page line P7 and the page line P25 is the last page (a page numbered 15) in the corresponding page line, and in other words, the addresses of the final encoded pages in the page line P7 and the page line P25 are the addresses of the pages numbered 15.

However, there are unprogrammed pages in some page lines, that is, the last programmed page in the page line is not the last page (the page numbered 15) in the page line.

Exemplarily, reference is made to the page line P30 in the 14th tag group, the page line P31 in the 15th tag group and the page line P32 in the 16th tag group as illustrated in FIG. 10, wherein among a plurality of pages corresponding to the page line P31, the page line P32 and the page line P33, respectively, the last programmed page is a page (a page numbered 7) located in a middle area in each page line; that is, among the page line P31, the page line P32 and the page line P33, the last programmed page is not the last page (the page numbered 15) in the page line.

Based on this, in some embodiments, the step of determining the address of the final encoded page of each page line in the ith tag group include acquiring a boundary page line; the boundary page line including a first page line where a page of an unprogrammed state among the pages in the page lines according to the programming sequence is located, and according to the address of the boundary page line, determining the address of the final encoded page of each page line in the ith tag group.

Here, the acquiring the boundary page line includes acquiring the address of an unprogrammed page among a plurality of page lines, wherein there may be one or more unprogrammed pages among the plurality of page lines, there may also be one or more page lines where the plurality of unprogrammed pages are located, which is related to the number of memory bits in the memory cell, and no repeated description will be given herein; and in other words, there are unprogrammed pages in a part of page lines among the plurality of page lines, wherein each page line among the part of page lines may include one or more unprogrammed pages, and it is taken as an example for illustration herein that, the number of the part of page lines is greater than 1, and there are a plurality of unprogrammed pages in each page line. In the part of page lines having the plurality of unprogrammed pages, the first page line according to the programming sequence is the boundary page line.

In some embodiments, the method for acquiring the boundary page line may include a traversal method, a dichotomy, and the like.

Exemplarily, referring to FIG. 10, in a plurality of page lines of the 14th tag group, the 15th tag group and the 16th tag group, there are unprogrammed pages in all of the page line P31, the page line P32 and the page line P33, that is, pages numbered 8-15 in the page line P31, pages numbered 8-15 in the page line P32, and pages numbered 8-15 in the page line P33. Here, according to the programming sequence, the page line P31 is the first page line where the unprogrammed pages are located, that is, the boundary page line.

Next, referring to FIG. 11, according to the address of the boundary page line, the address of the final encoded page of each page line in the ith tag group is determined by means of calculation (step 1103); for example, it is taken as an example that i=8, and the memory apparatus includes 36 page lines (P0-P35), the address of the final encoded page may be understood as the address of the page numbered 15 in each page line of the page line P7 and the page line P25.

Next, the recoding operation is performed on all pages of which the addresses are located between the address of the starting encoded page and the address of the final encoded page in each page line in the ith tag group, so as to obtain first check data (step 1104).

Exemplarily, it is taken as an example that i=8, and the memory apparatus includes 36 page lines (P0-P35), referring to FIG. 10, an encoding operation is performed on all pages, from the starting encoded page (the page numbered 0) to the final encoded page (the page numbered 15), of each page line of the page line P7 and the page line P25, so a to obtain first check data corresponding to the eighth tag group.

Next, the first check data is compared with second check data, and the second check data is correct check data corresponding to the ith tag group, wherein the second check data is stored in a check cache of the memory controller. It should be noted that, both the first check data and the second check data are parity data.

Based on this, in some embodiments, the method further includes acquiring the second check data from the check cache, and the second check data being correct check data corresponding to the tag group.

Next, according to a comparison result, it is determined whether the check data of the ith tag group is abnormal. When the comparison result shows that the first check data is the same as the second check data, it is determined that the check data of the ith tag group is not abnormal. In this case, the stored data corresponding to the ith tag group is correct data, and requires no recoding operation.

Based on this, the method further includes: when the check data of the ith tag group is not abnormal, continuing to perform an encoding operation on all pages of which the states are the programmed state in an (i+1)th tag group, and determining whether the check data corresponding to the (i+1)th tag group is abnormal.

It should be noted that, before the encoding operation is performed on all pages of which the states are the programmed state in the (i+1)th tag group, the method further includes:

using the address of the next page of the final encoded page of the current page line in the ith tag group as the address of the starting encoded page of the next page line of the current page line in the (i+1)th tag group.

Exemplarily, it is taken as an example that i=8, and the memory apparatus includes 36 page lines (P0-P35), referring to FIG. 10, the current page may be the page line P7 or the page line P25, it is taken as an example herein that the current page is the page line P25, the final encoded page may be understood as the page numbered 15 in the page line P25 of the eighth tag group, the next page of the final encoded page may be understood as the page numbered 0 in the page line P26, here, the page numbered 0 in the page line P26 is used as the starting encoded page of the page line P26 in the ninth tag group, that is, the address of the next page of the page numbered 15 in the page line P25 of the eighth tag group is used as the address of the starting encoded page of the page line P26 in the ninth tag group.

It should be noted that, the eighth tag group includes the page line P7 and the page line P25, when the current page is the page line P25, "the next page line of the current page line" is the page line P26; and when the current page is the page line P7, "the next page line of the current page line" is the page line P8.

The operation method of performing the encoding operation on all pages of which the states are the programmed state in the (i+1)th tag group and determining whether the check data corresponding to the (i+1)th tag group is abnormal is the same as the operation method of performing the encoding operation on all pages of which the states are the programmed state in the ith tag group and determining whether the check data corresponding to the ith tag group is abnormal, which has been described above, and thus will not be repeated here.

In some embodiments, the comparison result shows that the first check data is different from the second check data, indicating that the check data of the ith tag group is abnormal. At this time, the address of the starting encoded page of the last page line in the ith tag group needs to be corrected.

Specifically, when the comparison result shows that the first check data is different from the second check data, the final encoded page of the last page line in a (i−1)th tag group is acquired; when the final encoded page of the last page line in the (i−1)th tag group is not the last page of the last page line, the address of the first page in the next tag group of the last page of the last page line in the (i−1)th tag group is used as the address of a corrected starting encoded page of the last page line in the ith tag group; and the recoding operation is performed on the ith tag group by using the address of the corrected starting encoded page.

Exemplarily, it is taken as an example that i=8, and the memory apparatus includes 36 page lines (P0-P35), referring to FIG. 10, when the first check data of the eighth tag group is different from the second check data of the eighth tag group stored in the check cache, the final encoded page among a plurality of pages of the page line P24 in the seventh tag group is acquired. It should be noted that, the seventh tag group includes the page line P6 and the page line P24, and the last page line of the seventh tag group is the page line P24.

Here, it is judged whether the final encoded page of the last page line in the seventh tag group is the last page of the last page line (step 1105).

When the final encoded page (a page numbered 3 or 9 or 13 or the like) of the page line P24 in the seventh tag group is not the last page (the page numbered 15) of the last page line, the address of the first page (the page line P25) in the next tag group of the last page (the page numbered 15) of the page line P24 in the seventh tag group is used as the address of the corrected starting encoded page of the page line P25 in the eighth tag group.

In some embodiments, referring to step 1106 in FIG. 11, the address of the next encoded page is acquired through the address of the current encoded page; exemplarily, when the final encoded page of the last page line in the (i−1)th tag group is not the last page of the last page line, one is added to the serial number to which the final encoded page belongs, and the address thereof also changes accordingly; and it is judged whether the encoded page with one added to the serial number is the last encoded page of the last page line in the (i−1)th tag group, if not, the above operation is repeated until the final encoded page of the last page line in the (i−1)th tag group is the last page of the last page line, at this time, the address of the first page in the next tag group of the last page of the last page line in the (i−1)th tag group is used as the address of the corrected starting encoded page of the last page line in the ith tag group.

Exemplarily, when the serial number of the final encoded page of the page line P24 in the seventh tag group is 3, one serial number is added to the page numbered 3, that is, the serial number is 4, and it is judged whether the page numbered 4 is the final encoded page of the page line P24 in the seventh tag group; and the page numbered 4 is not the final encoded page of the page line P24 in the seventh tag group, at this time, one serial number is added to the page numbered 4, that is, the serial number is 5, and the above operation is repeated until the serial number of the final encoded page of the page line P24 in the seventh tag group is 15.

At this time, the address of the next page of the page numbered 15 in the page line P24 in the seventh tag group, that is, the address of the page numbered 0 in the page line P25 in the eighth tag group, is used as the address of the corrected starting encoded page of the page line P25 in the eighth tag group.

Next, the recoding operation is performed on the eighth tag group by using the address of the corrected starting encoded page (step 1107). The recoding operation has been described above, and thus will not be repeated herein. When the check data of the eighth tag group is not abnormal, the encoding operation is still performed on all pages of which the states are the programmed state in the ninth tag group, and it is determined whether the check data corresponding to the (i+1)th tag group is abnormal. When all tag groups in the memory apparatus have completed the recoding operation, that is, when the serial number of the tag group has reached a maximum value (here M), the recoding operation is ended (step 1108).

After the recoding operation, it is possible to only perform redundant array rebuild on the data with anomaly in the check data, so that the number of redundant array rebuilds can be reduced, the efficiency of redundant array rebuild is improved, the encoding specification of the rebuild operation is reduced, the logic thereof is simple, and the implementation and maintenance are easier, wherein the technology for performing a redundant array rebuild operation on the data is relatively mature, and thus will not be repeated herein again.

Based on the above operation method, in the embodiments of the present disclosure, after accidental power down and power on again, the recoding operation may be sequentially performed respectively on all pages of which the states are the programmed state in each tag group in the memory apparatus, so as to acquire the corresponding check data, wherein during the recoding operation process, in tag groups, the recoding operation is performed on all pages in one tag group, and then it is judged whether the check data corresponding to the current tag group is normal; if so, the recoding operation is performed on all pages in the next tag group, and if there is an anomaly, only all pages corresponding to the tag group are corrected; in this way, on one hand, a reprogramming operation can be more flexible, and it is unnecessary to be limited to perform the recoding operation on all pages in sequence according to the programming sequence; on the other hand, since one tag group corresponds to one piece of check data, when the reprogramming operation is performed on all pages in the same tag group, the number of switching times between the virtual block and the check cache can be reduced, and the performance of the memory system can be improved; in another aspect, after the recoding operation, the redundant array rebuild is only performed on data with anomaly in the check data, so that the number of rebuilds can be reduced, and the efficiency of redundant array rebuild is improved; and in yet another aspect, the redundant array rebuild is only performed on a part of the pages with anomaly in check data, and the coding specification of the rebuild operation can be reduced, and the logic thereof is simple, and the implementation and maintenance are easier.

Based on the above operation method of the memory system, the embodiments of the present disclosure further provide a memory system, and the memory system includes a memory apparatus and a memory controller coupled with the memory apparatus, wherein the memory apparatus includes at least one memory chip, and each memory chip includes a plurality of memory planes, each memory plane includes a plurality of pages, a plurality of pages located at the same position in each of the memory planes of the at least one memory chip form a page line, the memory apparatus includes a plurality of tag groups, each tag group includes a plurality of page lines. The memory controller can be configured to, when the memory apparatus is powered down and then powered on, respectively perform, in sequence, a recoding operation on all pages of which the states are programmed states in each tag group, and according to an encoding result corresponding to each tag group, respectively determine whether check data corresponding to each tag group is abnormal.

In some embodiments, the memory apparatus includes M tag groups, and the memory controller is configured to for an ith tag group, determine the address of a starting encoded page and the address of a final encoded page of each page line in the ith tag group, the starting encoded page including a first programmed page in each page line in the ith tag group according to a programming sequence, and the final encoded page including a last programmed page in each page line in the ith tag group according to the programming sequence, both M and i are integers, and 0≤i<M, perform an encoding operation on all pages of which the addresses are located between the address of the starting encoded page and the address of the final encoded page in each page line in the ith tag group, so as to obtain first check data, compare the first check data with second check data; the second check data being correct check data corresponding to the ith tag group; and according to a comparison result, determine whether the check data of the ith tag group is abnormal.

In some embodiments, the memory controller is configured to acquire a boundary page line; the boundary page line including a first page line where a page of an unprogrammed state among the pages in the page lines according to the programming sequence is located, and according to the address of the boundary page line, determine the address of the final encoded page of each page line in the ith tag group.

In some embodiments, the memory controller is configured to use the address of the next page of the final encoded page of the current page line in the ith tag group as the address of the starting encoded page of the next page line of the current page line in an (i+1)th tag group.

In some embodiments, the memory controller is configured to when the comparison result shows that the first check data is the same as the second check data, determine that the check data of the ith tag group is not abnormal, and continue to perform the encoding operation on all pages of which the states are the programmed state in the (i+1)th tag group, and determine whether the check data corresponding to the (i+1)th tag group is abnormal, and when the comparison result shows that the first check data is different from the second check data, correct the address of the starting encoded page of the last page line in the ith tag group.

In some embodiments, the memory controller is configured to when the comparison result shows that the first check data is different from the second check data, acquire the final encoded page of the last page line in an (i−1)th tag group, and, when the final encoded page of the last page line in the (i−1)th tag group is not the last page of the last page line, use the address of the first page in the next tag group of the last page of the last page line in the (i−1)th tag group as the address of the corrected starting encoded page of the last page line in the ith tag group; and perform the recoding operation on the ith tag group by using the address of the corrected starting encoded page.

In some embodiments, the memory controller is configured to acquire the second check data from a check cache.

In some embodiments, the plurality of memory planes included in the at least one memory chip may perform a programming operation at the same time.

In some embodiments, with a three-dimensional NAND memory as an example, when the three-dimensional NAND memory is programmed, a multi-plane program (the English expression of which is Multi-Plane Program) mode may be used for programming, that is, a plurality of memory planes stored in one three-dimensional NAND memory may perform the programming operation at the same time, so that the programming efficiency can be improved.

In some embodiments, the memory system includes a universal flash storage (UFS) device or a solid state disk (SSD, Solid State Disk).

It should be understood that, "one embodiment" or "an embodiment" mentioned throughout the specification means that particular features, structures or characteristics related to the embodiment is included in at least one embodiment of the present disclosure.

Thus, "in one embodiment" or "in an embodiment" appearing throughout the specification does not necessarily refer to the same embodiment. In addition, these particular features, structures or characteristics may be combined in any suitable manner in one or more embodiments. It should be understood that, in various embodiments of the present disclosure, the sizes of the serial numbers of the above processes do not mean that an execution sequence, the execution sequence of the processes should be determined by the functions and internal logic thereof, and should not constitute any limitation to the implementation process of the embodiments of the present disclosure. The sequence numbers of the embodiments of the present disclosure above are merely for description, and do not represent the advantages and disadvantages of the embodiments.

The methods disclosed in the several method embodiments provided by the present disclosure may be arbitrarily combined in the case of no conflict, so as to obtain a new method embodiment.

The foregoing descriptions are merely specific implementations of the present disclosure, but the protection scope of the present disclosure is not limited thereto, and modifications or substitutions, which may be easily conceived within the technical scope disclosed in the present disclosure by any person skilled in the art who is familiar with this art, should be covered within the protection scope of the present disclosure. Therefore, the protection scope of the present disclosure shall be subject to the protection scope of the claims.

The invention claimed is:

1. A memory system comprising a memory apparatus and a memory controller coupled with the memory apparatus, wherein:
the memory apparatus includes at least one memory chip, and each memory chip includes a plurality of memory planes, each memory plane having a plurality of pages, a plurality of pages located at a same position in each of the memory planes of the at least one memory chip form a page line, the memory apparatus includes a plurality of tag groups; each tag group having a plurality of page lines;
the memory controller is configured to:
when the memory apparatus is powered down and then powered on, respectively perform, in sequence, a recoding operation on all pages of which states are programmed states in each tag group;
according to an encoding result corresponding to each tag group, respectively determine whether check data corresponding to each tag group is abnormal; and
upon determining that the check data corresponding to a tag group is abnormal, correct an address of a starting encoded page of a last page line in the tag group.

2. The memory system of claim 1, wherein the memory apparatus includes M tag groups, and the memory controller is configured to:
for an $i^{th}$ tag group, determine an address of a starting encoded page and the address of a final encoded page of each page line in the $i^{th}$ tag group, the starting encoded page including a first programmed page in each page line in the $i^{th}$ tag group according to a programming sequence, and the final encoded page including a last programmed page in each page line in the $i^{th}$ tag group according to the programming sequence; both M and i are integers, and $0 \leq i < M$;
perform an encoding operation on all pages of which the addresses are located between the address of the starting encoded page and the address of the final encoded page in each page line in the $i^{th}$ tag group, so as to obtain first check data;
compare the first check data with second check data; the second check data being correct check data corresponding to the $i^{th}$ tag group; and
according to a comparison result, determine whether the check data of the ith tag group is abnormal.

3. The memory system of claim 2, wherein the memory controller is further configured to:
acquire a boundary page line having a first page line where a page of an unprogrammed state among the pages in the page lines according to the programming sequence is located; and
according to the address of the boundary page line, determine the address of the final encoded page of each page line in the $i^{th}$ tag group.

4. The memory system of claim 2, wherein the memory controller is further configured to:
use the address of the next page of the final encoded page of the current page line in the $i^{th}$ tag group as the address of the starting encoded page of the next page line of the current page line in an $(i+1)^{th}$ tag group.

5. The memory system of claim 4, wherein the memory controller is configured to:
when the comparison result shows that the first check data is the same as the second check data, determine that the check data of the $i^{th}$ tag group is not abnormal; and continue to perform the encoding operation on all pages of which the states are the programmed states in the $(i+1)^{th}$ tag group, and determine whether the check data corresponding to the $(i+1)^{th}$ tag group is abnormal; and
when the comparison result shows that the first check data is different from the second check data, correct the address of the starting encoded page of the last page line in the ith tag group.

6. The memory system of claim 5, wherein the memory controller is further configured to:
when the comparison result shows that the first check data is different from the second check data, acquire the final encoded page of the last page line in an $(i-1)^{th}$ tag group; and
when the final encoded page of the last page line in the $(i-1)^{th}$ tag group is not the last page of the last page line, use the address of the first page in the next tag group of the last page of the last page line in the $(i-1)^{th}$ tag group as the address of a corrected starting encoded page of the last page line in the $i^{th}$ tag group; and perform the recoding operation on the $i^{th}$ tag group by using the address of the corrected starting encoded page.

7. The memory system of claim 2, wherein the memory controller is further configured to:
acquire the second check data from a check cache.

8. The memory system of claim 1, wherein the plurality of memory planes included in the at least one memory chip may execute a programming operation at the same time.

9. The memory system of claim 1, wherein the memory system comprises a general flash memory or a solid state disk.

10. The memory system of claim 1, wherein all page lines in a same tag group correspond to same parity data.

11. The memory system of claim 1, wherein the recoding operation on all pages of which states are programmed states in each specific tag group is performed by:

performing a logic operation on data in the pages of which states are programmed states in the specific tag group, so as to obtain check data for error correction.

12. An operation method of a memory system that includes a memory apparatus and a memory controller coupled with the memory apparatus, wherein:

the memory apparatus includes at least one memory chip, and each memory chip includes a plurality of memory planes having a plurality of pages; the plurality of pages located at the same position in each of the memory planes of the at least one memory chip form a page line; the memory apparatus includes a plurality of tag groups; each tag group includes a plurality of page lines;

the operation method of the memory system comprises:

when the memory apparatus is powered down and then powered on, respectively performing, in sequence, a recoding operation on all pages of which the states are programmed states in each tag group in the memory apparatus;

according to an encoding result corresponding to each tag group, respectively determining whether check data corresponding to each tag group is abnormal; and upon determining that the check data corresponding to a tag group is abnormal, correcting an address of a starting encoded page of a last page line in the tag group.

13. The operation method of the memory system of claim 12, where in the memory apparatus includes M tag groups, and the step of respectively performing the recoding operation on all pages of which the states are the programmed states in each tag group in the memory apparatus, and according to the encoding result corresponding to each tag group, respectively determining whether the check data corresponding to each tag group is abnormal comprises:

for an $i^{th}$ tag group, determining the address of a starting encoded page and the address of a final encoded page of each page line in the $i^{th}$ tag group, the starting encoded page including a first programmed page in each page line in the $i^{th}$ tag group according to a programming sequence, and the final encoded page comprising a last programmed page in each page line in the ith tag group according to the programming sequence; both M and i are integers, and $0 \leq i < M$;

performing an encoding operation on all pages of which the addresses are located between the address of the starting encoded page and the address of the final encoded page in each page line in the $i^{th}$ tag group, so as to obtain first check data;

comparing the first check data with second check data; the second check data being correct check data corresponding to the $i^{th}$ tag group; and according to a comparison result, determining whether the check data of the ith tag group is abnormal.

14. The operation method of the memory system of claim 13, wherein the step of determining the address of the final encoded page of each page line in the $i^{th}$ tag group comprises:

acquiring a boundary page line that includes a first page line where a page of an unprogrammed state among the pages in the page lines according to the programming sequence is located; and according to the address of the boundary page line, determining the address of the final encoded page of each page line in the $i^{th}$ tag group.

15. The operation method of the memory system of claim 13, wherein the method further comprises:

using the address of the next page of the final encoded page of the current page line in the $i^{th}$ tag group as the address of the starting encoded page of the next page line of the current page line in an $(i+1)^{th}$ tag group.

16. The operation method of the memory system of claim 15, wherein the step of according to the comparison result, determining whether the check data of the $i^{th}$ tag group is abnormal comprises:

when the comparison result shows that the first check data is the same as the second check data, determining that the check data of the $i^{th}$ tag group is not abnormal; and when the comparison result shows that the first check data is different from the second check data, correcting the address of the starting encoded page of the last page line in the ith tag group; and the method further comprises:

when the check data of the $i^{th}$ tag group is not abnormal, continuing to perform the encoding operation on all pages of which the states are the programmed states in the $(i+1)^{th}$ tag group, and determining whether the check data corresponding to the $(i+1)^{th}$ tag group is abnormal.

17. The operation method of the memory system of claim 16, characterized in that, the step of when the comparison result shows that the first check data is different from the second check data, correcting the address of the starting encoded page of the last page line in the $i^{th}$ tag group comprises:

when the comparison result shows that the first check data is different from the second check data, acquiring the final encoded page of the last page line in an $(i-1)^{th}$ tag group;

when the final encoded page of the last page line in the $(i-1)^{th}$ tag group is not the last page of the last page line, using the address of the first page in the next tag group of the last page of the last page line in the $(i-1)^{th}$ tag group as the address of a corrected starting encoded page of the last page line in the $i^{th}$ tag group; and performing the recoding operation on the $i^{th}$ tag group by using the address of the corrected starting encoded page.

18. The operation method of the memory system of claim 13, characterized in that, method further comprises:

acquiring the second check data from a check cache.

19. The operation method of the memory system of claim 12, wherein all page lines in a same tag group correspond to same parity data.

20. The operation method of the memory system of claim 12, wherein the recoding operation on all pages of which states are programmed states in each specific tag group is performed by:

performing a logic operation on data in the pages of which states are programmed states in the specific tag group, so as to obtain check data for error correction.

* * * * *